US011172459B2

(12) United States Patent
Kim et al.

(10) Patent No.: US 11,172,459 B2
(45) Date of Patent: Nov. 9, 2021

(54) METHOD FOR MANAGING SESSION, AND SMF NODE FOR PERFORMING METHOD

(71) Applicant: LG Electronics Inc., Seoul (KR)

(72) Inventors: Hyunsook Kim, Seoul (KR); Laeyoung Kim, Seoul (KR); Jinsook Ryu, Seoul (KR); Sangmin Park, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 16/619,380

(22) PCT Filed: Oct. 30, 2017

(86) PCT No.: PCT/KR2017/012060
§ 371 (c)(1),
(2) Date: Dec. 4, 2019

(87) PCT Pub. No.: WO2018/230778
PCT Pub. Date: Dec. 20, 2018

(65) Prior Publication Data
US 2021/0136719 A1    May 6, 2021

Related U.S. Application Data

(60) Provisional application No. 62/522,130, filed on Jun. 20, 2017, provisional application No. 62/519,767, filed on Jun. 14, 2017.

(51) Int. Cl.
*H04W 60/04* (2009.01)
*H04W 76/30* (2018.01)
*H04W 8/08* (2009.01)
*H04W 48/16* (2009.01)

(52) U.S. Cl.
CPC .............. *H04W 60/04* (2013.01); *H04W 8/08* (2013.01); *H04W 48/16* (2013.01); *H04W 76/30* (2018.02)

(58) Field of Classification Search
CPC . H04W 16/34; H04W 16/27; H04W 36/0016; H04W 36/14; H04W 36/0022;
(Continued)

(56) References Cited

U.S. PATENT DOCUMENTS 10,462,840 B2 * 10/2019 Dao ...................... H04W 76/30
10,728,952 B2 *  7/2020 Dao .................... H04L 65/1069
(Continued)

FOREIGN PATENT DOCUMENTS

EP       3678448 A1 *  7/2020
WO   WO2021067913 A1 *  4/2021

OTHER PUBLICATIONS

United States Provisional Application Specification U.S. Appl. No. 62/444,251, filed Jan. 2017 (Year: 2017).*
(Continued)

*Primary Examiner* — William D Cumming
(74) *Attorney, Agent, or Firm* — Dentons US LLP

(57) ABSTRACT

Provided is a method for managing a local area data network (LADN) session, as well as a session management function (SMF) node that is capable of performing this method. The method involves determining whether to release or deactivate the LADN session of a terminal based on information received by the SMF from an access and mobility management function (AMF) node. The information includes location information relating to the terminal and information as to whether the terminal is de-registered from a 3GPP access network. If the terminal is instead connected via a non-3GPP access network, the method helps avoid terminal location inaccuracies typically associated with non-3GPP access networks.

10 Claims, 15 Drawing Sheets

(58) Field of Classification Search
CPC ... H04W 8/065; H04W 60/04; H04W 36/033; H04W 70/11; H04W 70/27; H04W 70/30
See application file for complete search history.

(56) References Cited

U.S. PATENT DOCUMENTS

| | | | |
|---|---|---|---|
| 10,798,618 B2* | 10/2020 | Kim | H04W 80/10 |
| 10,813,165 B2* | 10/2020 | Dao | H04W 36/14 |
| 10,820,368 B2* | 10/2020 | Dao | H04W 76/10 |
| 10,849,186 B2* | 11/2020 | Dao | H04L 65/1089 |
| 10,893,574 B2* | 1/2021 | Kim | H04W 76/34 |
| 10,917,868 B2* | 2/2021 | Youn | H04W 8/065 |
| 10,944,666 B2* | 3/2021 | Lee | H04L 41/0806 |
| 2016/0227597 A1 | 8/2016 | Cho et al. | |
| 2018/0198867 A1* | 7/2018 | Dao | H04W 36/0033 |
| 2018/0199240 A1* | 7/2018 | Dao | H04W 36/14 |
| 2018/0199398 A1* | 7/2018 | Dao | H04L 65/1069 |
| 2019/0200264 A1* | 6/2019 | Kim | H04W 60/04 |
| 2019/0289506 A1* | 9/2019 | Park | H04W 76/27 |
| 2020/0015314 A1* | 1/2020 | Dao | H04W 76/27 |
| 2020/0029388 A1* | 1/2020 | Dao | H04W 76/30 |
| 2020/0052999 A1* | 2/2020 | Lee | H04L 41/0806 |
| 2020/0077356 A1* | 3/2020 | Youn | H04W 8/065 |
| 2020/0127968 A1* | 4/2020 | Tang | H04L 41/0813 |
| 2020/0145876 A1* | 5/2020 | Dao | H04L 12/1407 |
| 2020/0178136 A1* | 6/2020 | Xu | H04W 76/11 |
| 2020/0205226 A1* | 6/2020 | Xiong | H04W 36/00 |
| 2020/0245404 A1* | 7/2020 | Suh | H04W 8/08 |
| 2020/0275513 A1* | 8/2020 | Park | H04W 76/20 |
| 2020/0280896 A1* | 9/2020 | Ying | H04W 76/11 |
| 2020/0314950 A1* | 10/2020 | Dao | H04L 65/1069 |
| 2020/0351973 A1* | 11/2020 | Mannweiler | H04W 76/25 |
| 2020/0367115 A1* | 11/2020 | Kim | H04W 88/14 |
| 2020/0382941 A1* | 12/2020 | Lee | H04W 28/065 |
| 2021/0007042 A1* | 1/2021 | Zhu | H04W 60/06 |
| 2021/0029770 A1* | 1/2021 | Ying | H04W 76/18 |
| 2021/0037585 A1* | 2/2021 | Youn | H04W 76/30 |
| 2021/0068172 A1* | 3/2021 | Jeong | H04W 76/10 |
| 2021/0136719 A1* | 5/2021 | Kim | H04W 8/08 |

OTHER PUBLICATIONS

United States Provisional Application Drawings U.S. Appl. No. 62/444,251, filed Jan. 2017 (Year: 2017).*

United States Provisional Application Specification U.S. Appl. No. 62/448,239, filed Jan. 2017 (Year: 2017).*

United States Provisional Application Drawings U.S. Appl. No. 62/448,239, filed Jan. 2017 (Year: 2017).*

United States Provisional Application Specification U.S. Appl. No. 62/455,412, filed Feb. 2017 (Year: 2017).*

United States Provisional Application Drawings U.S. Appl. No. 62/455,412, filed Feb. 2017 (Year: 2017).*

United States Provisional Application Specification U.S. Appl. No. 62/460,533, filed Feb. 2017 (Year: 2017).*

United States Provisional Application Drawings U.S. Appl. No. 62/460,533, filed Feb. 2017 (Year: 2017).*

United States Provisional Application Specification U.S. Appl. No. 62/472,720, filed Mar. 2017 (Year: 2017).*

United States Provisional Application Drawings U.S. Appl. No. 62/472,720, filed Mar. 2017 (Year: 2017).*

United States Provisional Application Specification U.S. Appl. No. 62/492,045, filed Apr. 2017 (Year: 2017).*

United States Provisional Application Drawings U.S. Appl. No. 62/492,045, filed Apr. 2017 (Year: 2017).*

United States Provisional Application Specification U.S. Appl. No. 62/503,117, filed May 2017 (Year: 2017).*

Data Consistency in the 5G Specification by Jonathan Sid-Otmane; Sofiane Imadali; Frederic Martelli; Marc Shapiro, Published in: 2020 23rd Conference on Innovation in Clouds, Internet and Networks and Workshops (ICIN) Apr. 2020 (Year: 2020).*

Data Consistency in the 5G Specification by onathan Sid-Otmane • Sofiane Imadali • Frederic Martelli • Marc Shapiro Published in: 2020 23rd Conference on Innovation in Clouds, Internet and Networks and Workshops (ICIN) (pp. 110-117) Feb. 2020 (Year: 2020).*

Qualcomm Incorporated et al., "TS 23.501: PDU Sessions Handling for LADNs," S2-173987, SA WG2 Meeting #121, Hangzhou, P.R. China, May 20, 2017, see sections 1, 5.6.5.

Samsung et al., "TS 23.502—Update 4.3.2 PDU Session Establishment for LADN," S2-172939, SA WG2 Meeting #S2-121, Hangzhou, China, May 8, 2017, see section 4.3.2.2.1 and figure 4.3.2.2.1-1.

Samsung, "TS 23.502—Update 4.2.2.2 General Registration," S2-173269, SA WG2 Meeting #S2-121, Hangzhou, China, May 8, 2017, see sections 1, 4.2.2.2.

Nokia et al., "TS 23.501: PDU Sessions Handling for LADNs," S2-173525, SA WG2 Meeting #S2-121, Hangzhou, China, May 9, 2017, see sections 1, 5.6.5.

* cited by examiner

METHOD FOR MANAGING SESSION, AND SMF NODE FOR PERFORMING METHOD

This application is the National Stage filing under 35 U.S.C. 371 of International Application No. PCT/KR2017/012060, filed on Oct. 30, 2017, which claims the benefit of U.S. Provisional Application Nos. 62/519,767 filed on Jun. 14, 2017, and 62/522,130 filed on Jun. 20, 2017, the contents of which are all hereby incorporated by reference herein in their entirety.

FIELD OF THE DISCLOSURE

The present disclosure relates to a next generation mobile communication.

RELATED ART

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP |

TABLE 1-continued

| Reference point | Description |
|---|---|
| | access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 3 may perform all or a part of the MME (Mobility Management Entity) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The PCF (Policy Control Function) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like an HSS (Home Subscriber Server) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

On the other hand, in a situation where the UE roams on a visited network, for example, a V-PLMN, there are two schemes for processing a signaling request from the UE. In the first scheme, that is, LBO (local break out) scheme, the visited network handles the signaling request from the UE. According to the second scheme, that is, Home Routing (HR) scheme, the visited network transmits a signaling request from the UE to the home network of the UE.

FIG. 3A is an exemplary diagram illustrating an architecture to which a local breakout (LBO) scheme is applied when the UE is roaming; FIG. 3B is an exemplary diagram illustrating an architecture to which an HR (home routed) scheme is applied when the UE is roaming.

As shown in FIG. 3A, in the architecture to which the LBO scheme is applied, a PCF node in the VPLMN performs an interaction with an AF node to generate a PCC rule for a service in the VPLMN. The PCF node in the VPLMN creates the PCC rule based on the policy set therein according to the roaming agreement with the HPLMN provider.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

FIG. 3A is an exemplary diagram illustrating an example of an architecture for implementing the concept of network slicing.

As can be seen from FIG. 3A, the core network (CN) may be divided into several slice instances. Each slice instance may contain one or more of a CP function node and a UP function node.

Each UE may use a network slice instance corresponding to its service through RAN.

Unlike the case shown in FIG. 3A, each slice instance may share one or more of a CP function node, and a UP function node with another slice instance. This will be described with reference to FIG. 4 below.

FIG. 3B is an exemplary view showing another example of an architecture for implementing the concept of network slicing.

Referring to FIG. 3B, a plurality of UP function nodes are clustered, and a plurality of CP function nodes are also clustered.

Further, referring to FIG. 3B, slice instance #1 (or instance #1) in the core network includes a first cluster of an UP function node. Moreover, the slice instance #1 shares the cluster of the CP function node with slice instance #2 (or instance #2). The slice instance #2 includes a second cluster of an UP function node.

The illustrated NSSF selects a slice (or instance) that can accommodate the UE's service.

The illustrated UE may use the service #1 via the slice instance #1 selected by the NSSF and may use the service #2 via the slice instance #2 selected by the NSSF.

<Interworking with Legacy 4th Generation Mobile Communication System>

Even if the UE leaves the coverage of the next generation RAN (Radio Access Network), the UE must be able to receive service via a 4G mobile communication system. This is called interworking. Hereinafter, interworking will be described in detail.

FIG. 4A shows an architecture for interworking when the UE is not roaming, and FIG. 4B shows an architecture for interworking when the UE is roaming.

Referring to FIG. 4A, when the UE does not roam, E-UTRAN and EPC for legacy 4th generation LTE, and 5th generation mobile communication network may be interworked with each other. In FIG. 4A, a packet data network gateway (PGW) for a legacy EPC is divided into a PGW-U, which is responsible for only the user plane, and a PGW-C, which is responsible for the control plane. Moreover, the PGW-U is merged into the UPF node of the fifth-generation core network, and the PGW-C is merged into the SMF node of the fifth-generation core network. Moreover, the Policy and Charging Rules Function (PCRF) for the legacy EPC may be merged into the PCF of the 5th generation core network. Moreover, the HSS for the legacy EPC may be merged into the UDM of the 5th generation core network. The UE may access the core network through the E-UTRAN. Alternatively, the UE may access the core network through the 5G radio access network (RAN) and the AMF.

Referring to FIGS. 4A and 4B while comparing FIGS. 4A and 4B, when the UE roams on a Visited Public Land Mobile Network (VPLMN), the data of the UE is delivered via the Home PLMN (HPLMN).

Meanwhile, the N26 interface shown in FIGS. 4A and 4B refers to an interface connected between the MME and the AMF node to facilitate interworking between the EPC and the NG core. This N26 interface may be selectively supported depending on the network operator. That is, for interworking with the EPC, the network operator may provide the N26 interface or may not provide the N26 interface.

<LADN (Local Area Data Network)>

On the other hand, in the next generation (i.e., fifth generation) mobile communication, it is considered to provide a local area service (or a specialized service for each geographical area). This local service is considered to be called as LADN in the next generation mobile communication.

FIG. 6 shows an example of a LADN service.

Referring to FIG. 6, when the UE is located in a predetermined service area, the UE may receive the LADN service. To this end, when the UE enters the predetermined service area, the UE may generate a PDU (Packet Data Unit) session for the LADN.

On the other hand, when the terminal is connected to the network via the non-3GPP network, the network uses granularity of a non-3GPP interworking function (N3IWF) node to determine the location of the terminal, and as a result, there is a disadvantage in that the accuracy is lower than when the terminal is connected to the network via the 3GPP network.

It is determined whether to provide a service/session based on whether the terminal is located in a service area, and when the terminal is connected to the network via the non-3GPP network, it is difficult to accurately determine the location of the terminal, such that it is difficult to manage LADN sessions.

SUMMARY OF THE DISCLOSURE

The present disclosure provides a method for managing a local area data network (LADN) session and a session management function (SMF) for performing the method.

In order to achieve the above object, an aspect of the present disclosure provides a method for managing a session by a session management function (SMF) node. In an aspect, The method for managing a session may include: transmitting, to an access and mobility management function (AMF) node, a registration request to notify status information of a user equipment (UE) accessible to a local area data network (LADN) via any one of a first access network and a second access network; receiving a changed status information from the AMF node when the status information of the UE is changed; and determining whether to release or deactivate a PDU session of the UE based on the received information.

The deactivation of the PDU session of the UE may not release the PDU session itself, but releases only a resource of a user plane (UP) by the PDU session, and maintain a context of the PDU session.

In the determining whether to release or deactivate the PDU session of the UE, the PDU session of the UE may be determined to be deactivated, and the received information may further include information collected by the second access network.

The method may further include: receiving, from the AMF node, status information indicating that the UE is disconnected from the second access network; and releasing the PDU session of the LADN based on the status information.

The status information may further include information indicating that the disconnection from the second access network is temporary, and the receiving of, from the AMF node, the status information indicating that the UE is disconnected from the second access network may further include: receiving, from the AMF node, registration information indicating reconnection when the UE is reconnected to the second access network according to the status information; and determining whether to reactivate the deactivated PDU session.

The status information may further include information indicating that the disconnection from the second access network is temporary, and the receiving of, from the AMF node, the status information indicating that the UE is disconnected from the second access network may further include: receiving, from the AMF node, registration information indicating reconnection when the UE is reconnected to the second access network according to the status information; and continuously deactivating the first access network and changing only buffering setting of a user plane function (UPF), when the first network is deactivated before the second access network is released.

In order to achieve the above object, an aspect of the present disclosure provides a session management function (SMF) node for managing a session. The SMF node may include: a transceiver configured to transmit and receive, from an access and mobility management function (AMF) node, status information of a user equipment (UE) accessible to a local area data network (LADN) via any one of a first access network and a second access network and a changed status information when the status information of the UE is changed; and a processor configured to determine whether to release or deactivate a PDU session of the UE based on the received information indicating that the UE is out of a service area of the first access network.

According to the disclosure of the present disclosure, the problem of the conventional technology described above may be solved.

DESCRIPTION OF EXEMPLARY EMBODIMENTS

Figure 1:
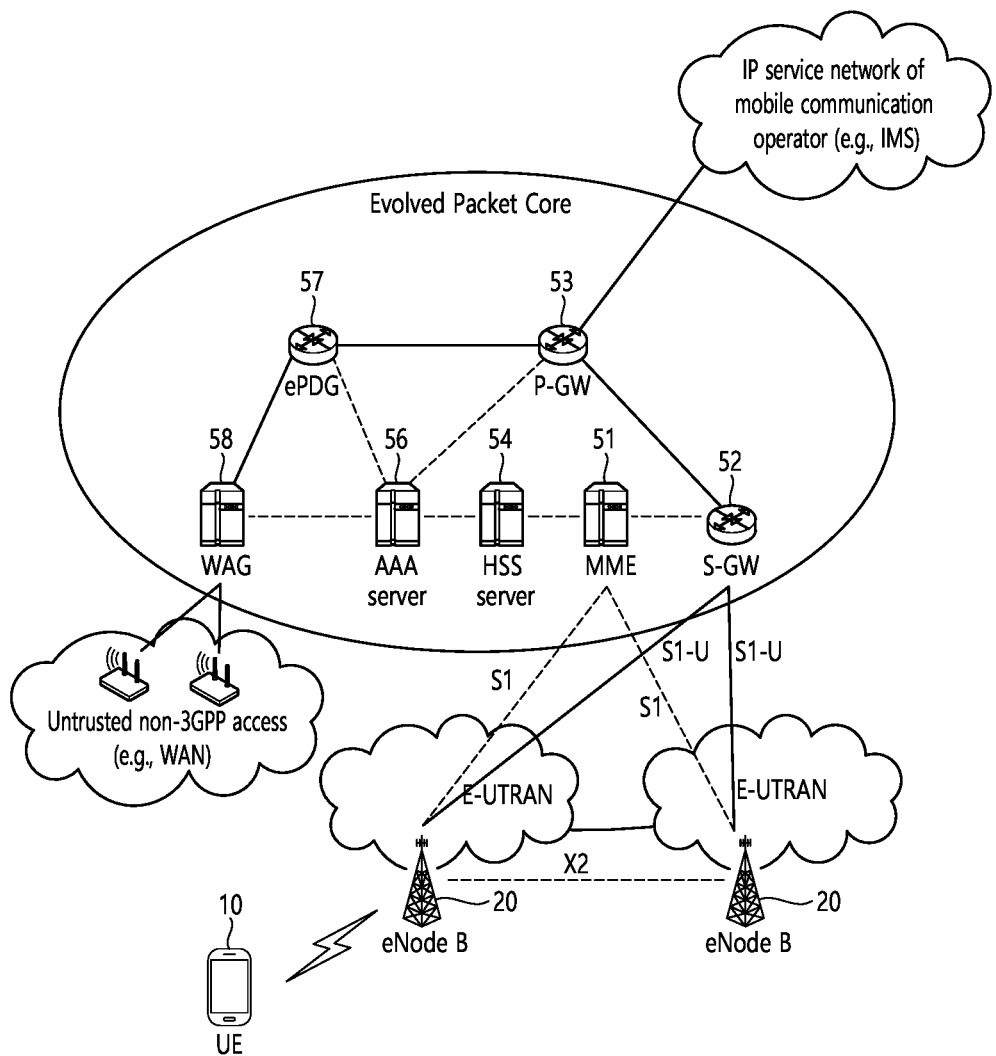
FIG. 1 shows the configuration of an evolved mobile communication network.
Figure 2:
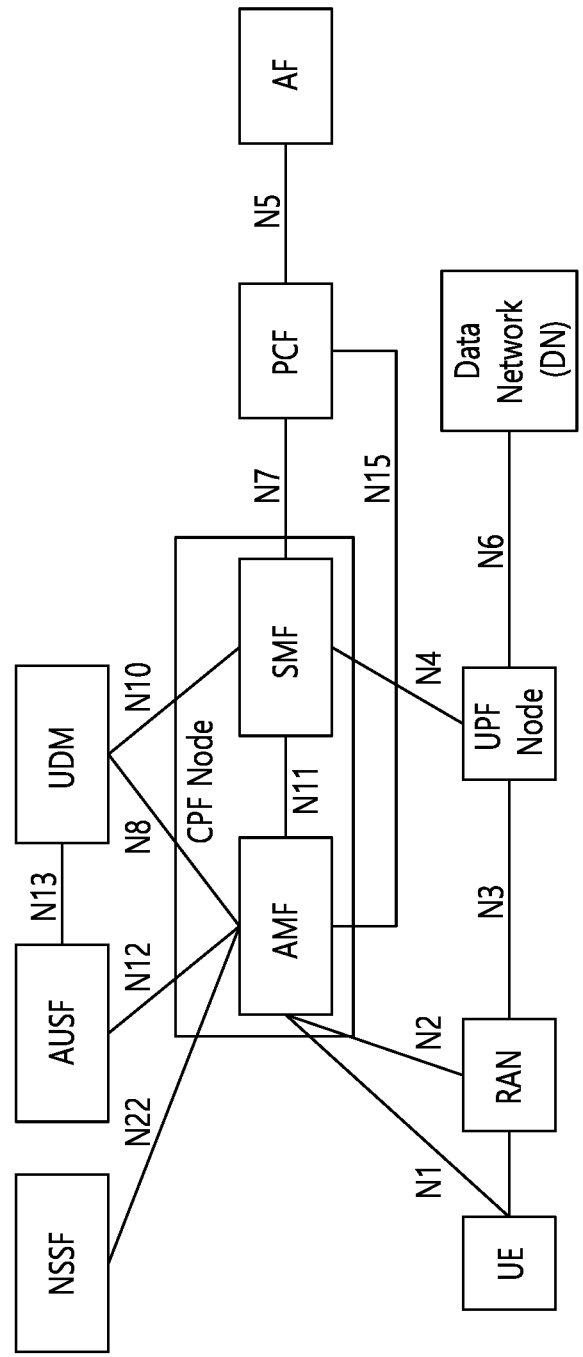
FIG. 2 is an exemplary diagram illustrating a predicted structure of a next generation mobile communication in terms of a node.
Figure 3A:
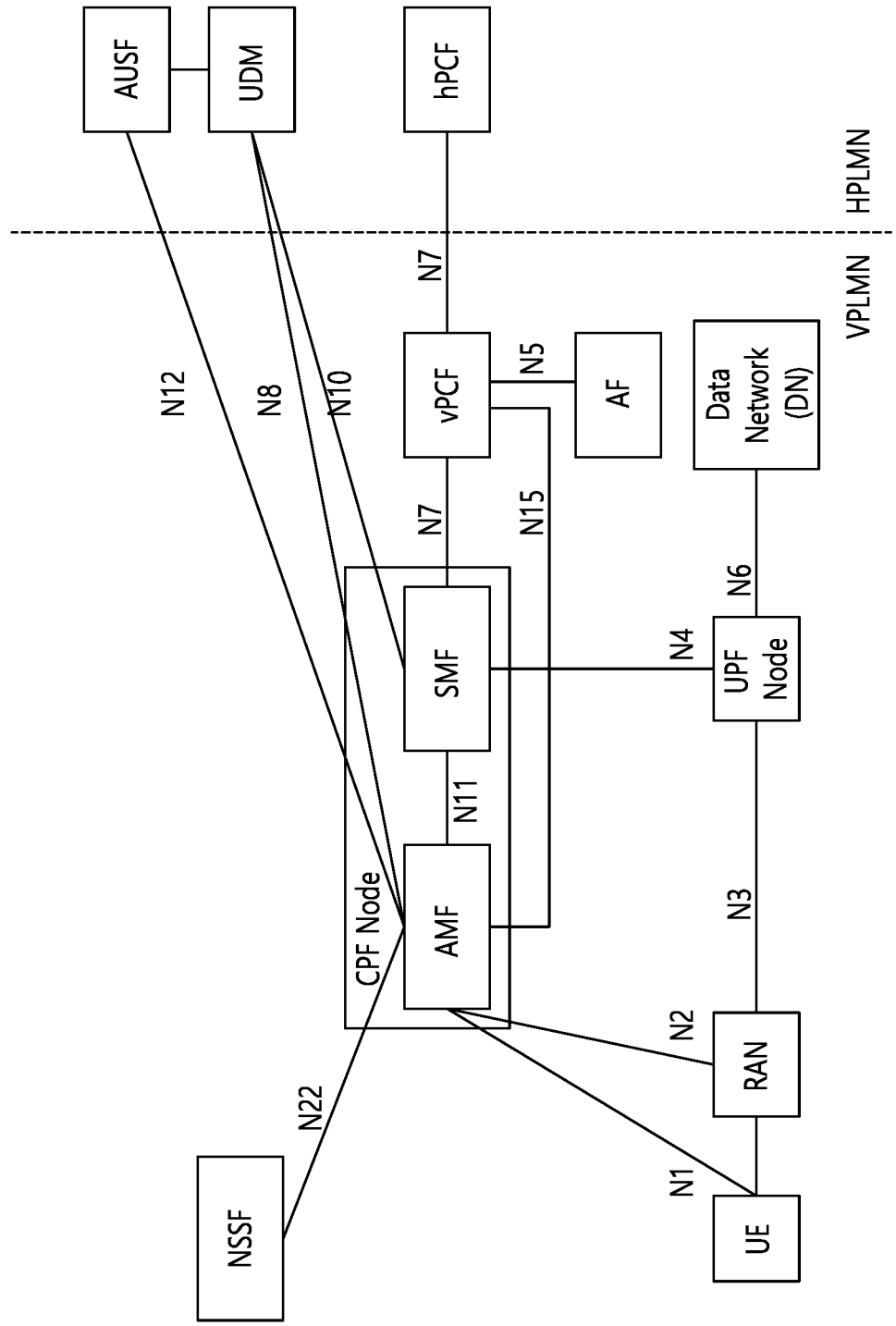
FIG. 3A is an exemplary diagram illustrating an architecture to which a local breakout (LBO) scheme is applied when roaming.
Figure 3B:
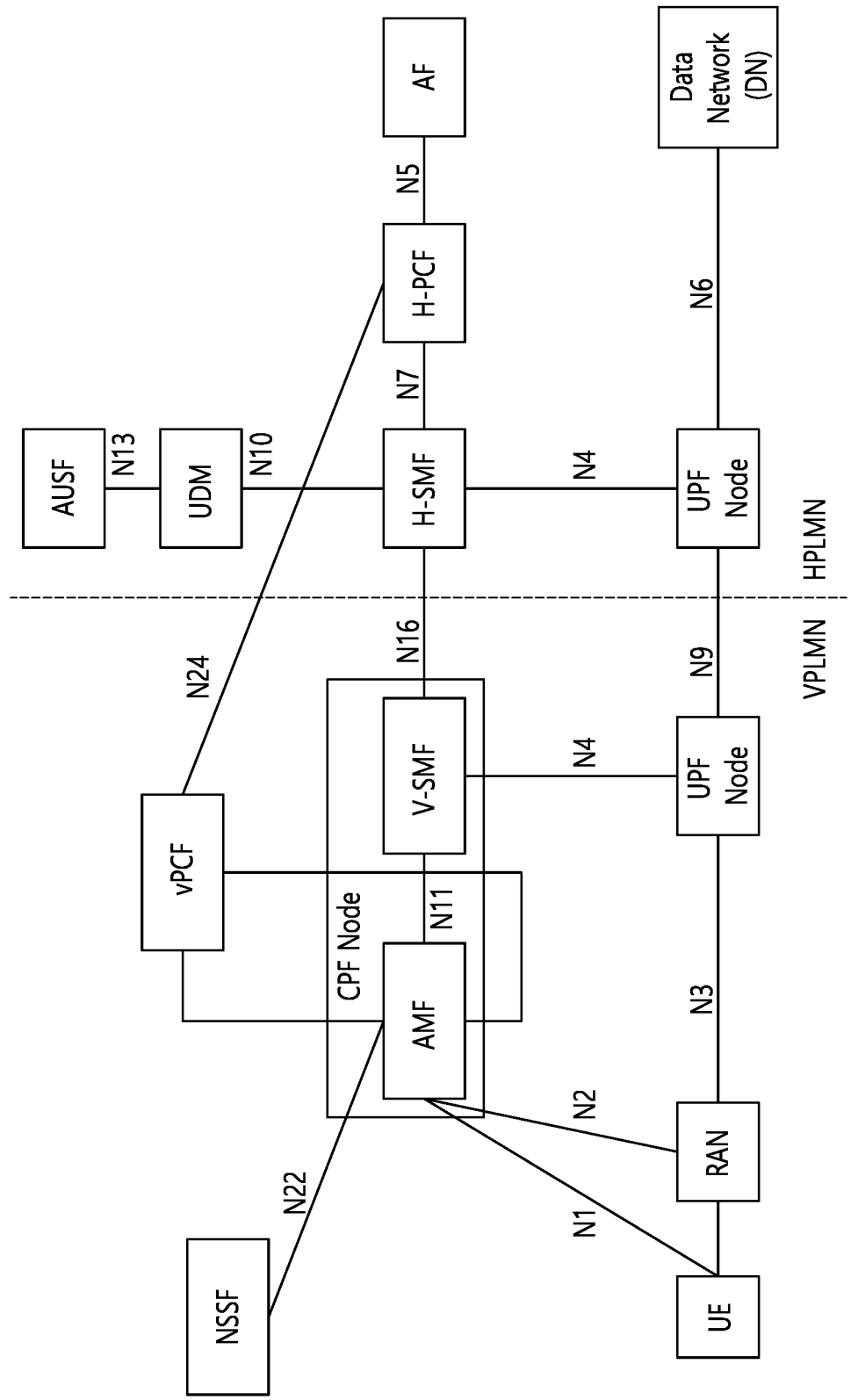
FIG. 3B is an exemplary diagram illustrating an architecture to which an HR (home routed) scheme is applied when roaming.
Figure 4A:
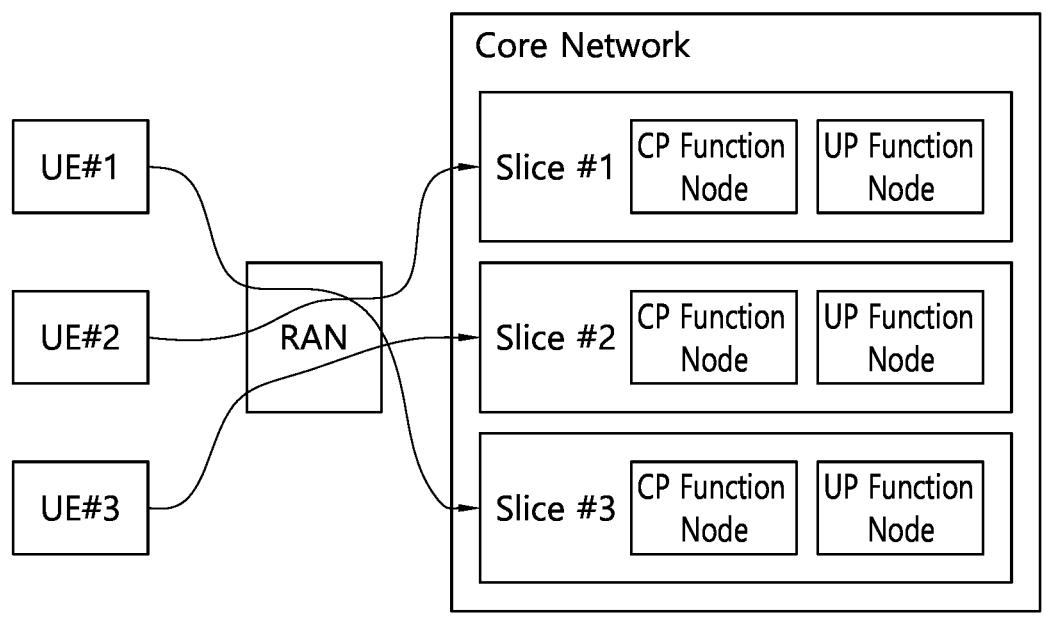
FIG. 4A is an exemplary view illustrating an example of an architecture for implementing the concept of network slicing.
Figure 4B:
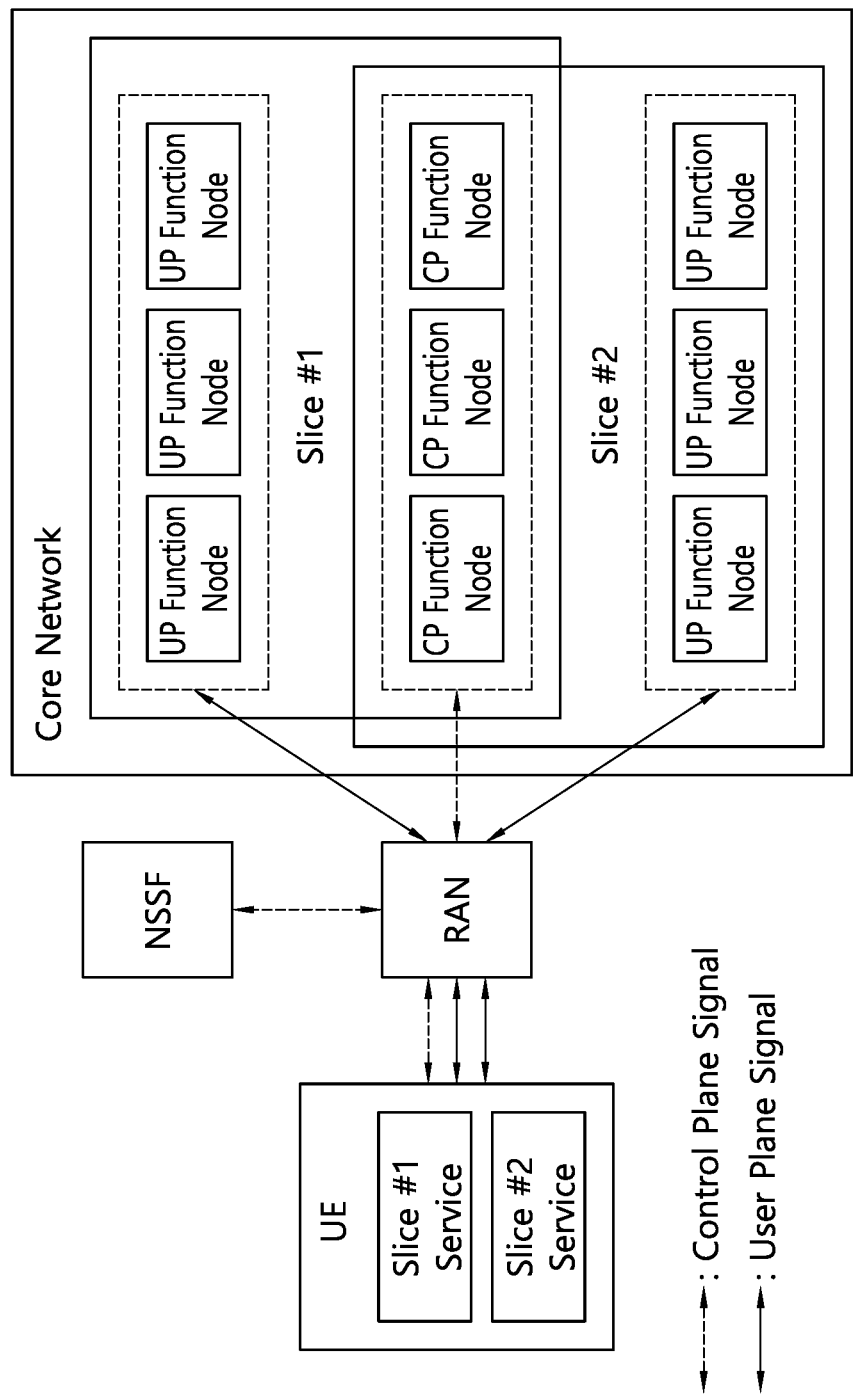
FIG. 4B is an exemplary diagram illustrating another example of an architecture for implementing the concept of network slicing.
Figure 5A:
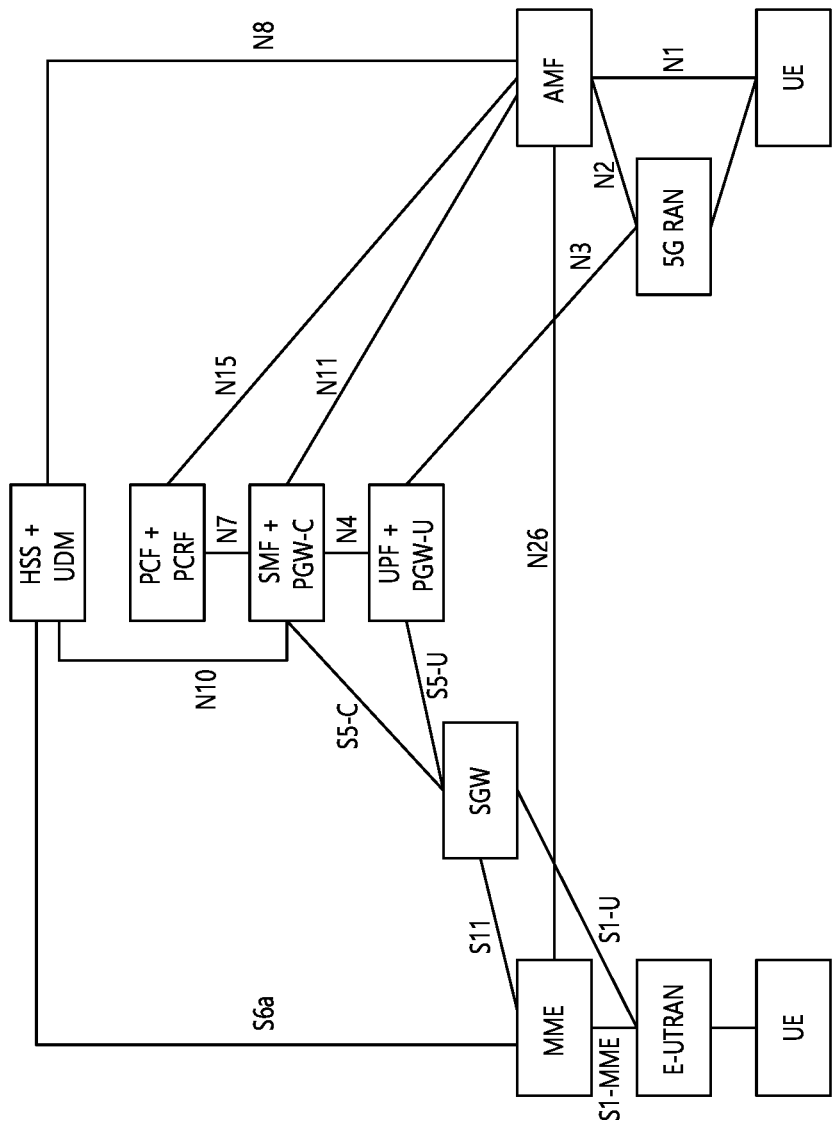
FIG. 5A shows an architecture for interworking when a UE does not roam.
Figure 5B:
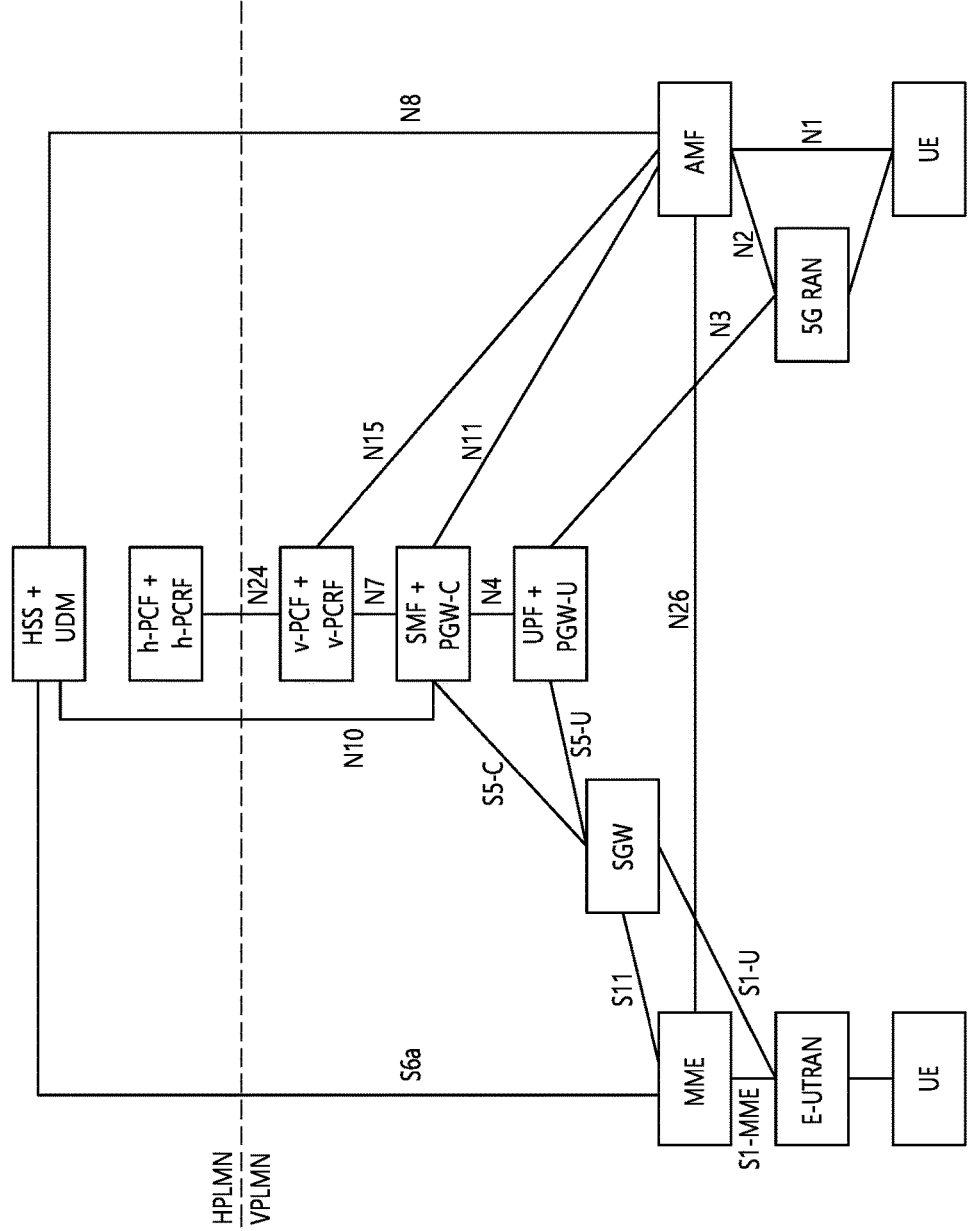
FIG. 5B shows an architecture for interworking when a UE is roaming.
Figure 6:
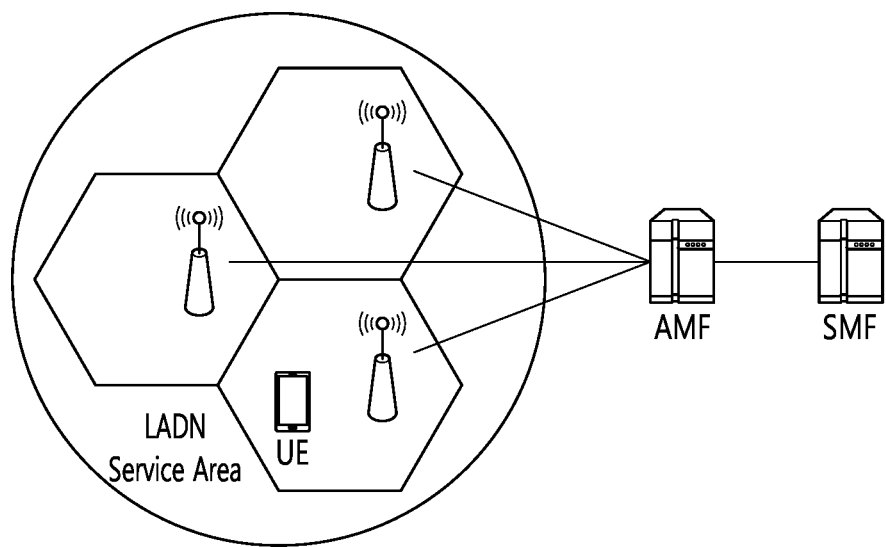
FIG. 6 shows an example of a LADN service.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the disclosure with reference to the accompanying drawings.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A PDN connection refers to a connection from UE to a PDN, that is, an association (or connection) between UE represented by an IP address and a PDN represented by an APN.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

<LADN (Local Area Data Network)>

In the next generation (i.e., fifth generation) mobile communication, it is considered to provide a local area service (or a specialized service for each geographical area). This local service is considered to be called as LADN in the next generation mobile communication.

Figure 7:
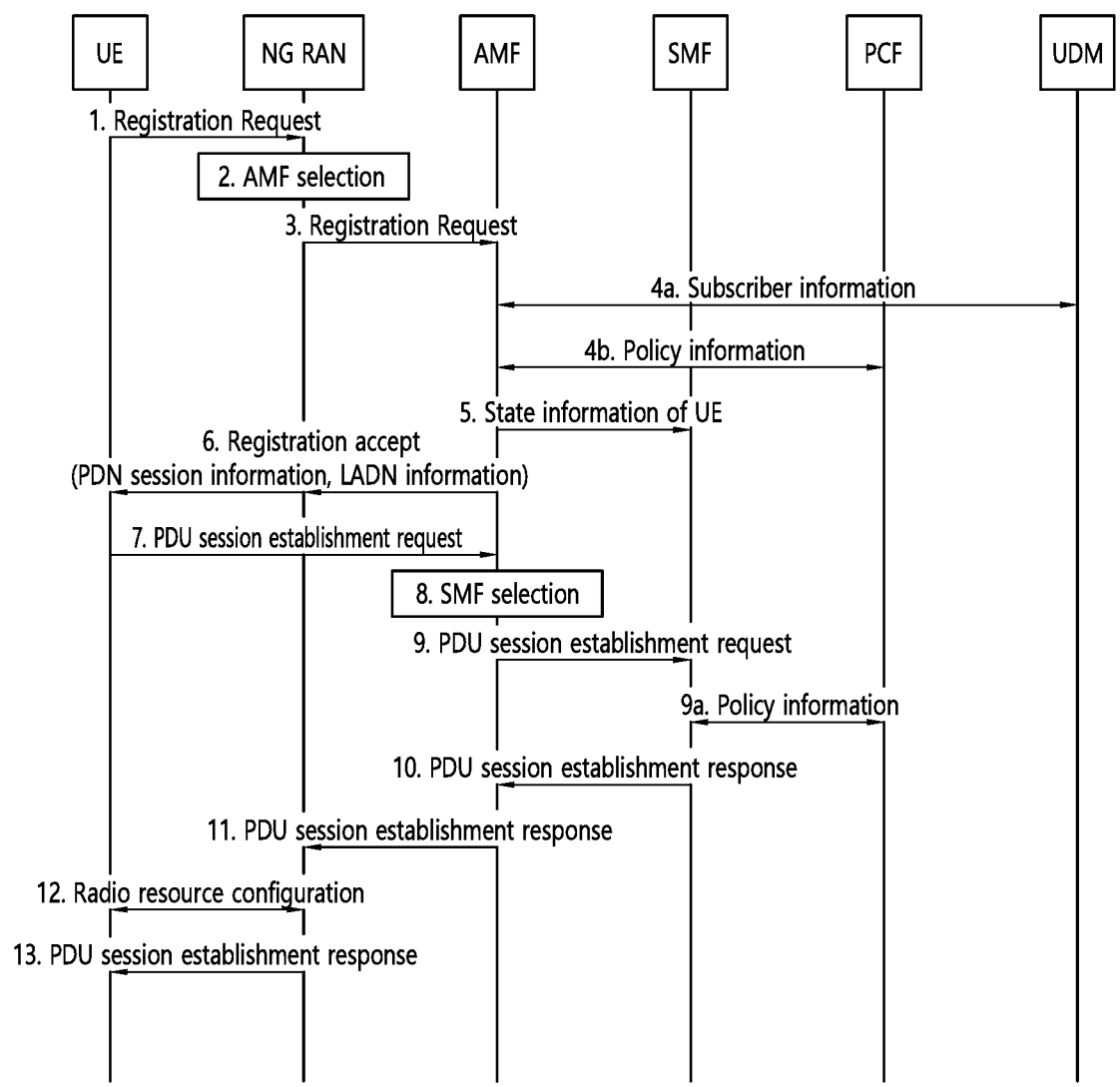
FIG. 7 shows a registration procedure and a PDU session establishment procedure.

FIG. 7 shows a registration procedure and a PDU session establishment procedure.

1) Referring to FIG. 7, the UE transmits a registration request message to the base station of the NG RAN. If there is a previously established PDU session by the UE, the UE may include information on the previously established PDU session in the registration request message.

2) Then, the base station of the NG RAN selects an AMF node.

3) Moreover, the base station of the NG RAN transmits the registration request message to the selected AMF node.

4) The AMF node obtains the subscriber information of the UE from the UDM. In addition, the AMF node obtains policy information from the PCF.

5) Moreover, the AMF node transmits to the SMF node the status information of the UE (i.e., information indicating that the UE is now able to receive a signal).

6) The AMF node transmits a Registration Accept message to the UE. At this time, if there is a previously established PDU session, the registration accept message may include information about the PDN session. Further, if the UE is subscribed to the LADN service, the AMF node may include the LADN information into the registration accept message. The LADN information may include LADN identification information and information about LADN service valid within a pre-registered geographical area. Further, the LADN information may include information on the pre-registered geographical area.

7) Meanwhile, if there is no PDU session previously established by the UE, the UE transmits a PDU session establishment request message to the AMF node through the NG RAN.

8) The AMF node selects an SMF node for the UE.

9) Moreover, the AMF node transmits a PDU session establishment request to the SMF node.

9a) The AMF node obtains policy information about session establishment from the PCF node.

10 to 12) Upon receiving a PDU session establishment response message from the SMF node, the AMF node transmits a PDU session establishment request to the base station of the NG RAN. Thus, the base station of the NG RAN establishes radio resources.

13) The base station of the NG RAN transmits the PDU session establishment response message to the UE.

Meanwhile, although not shown, if there is a PDU session previously established by the UE, the UE may transmit a service request message instead of the PDU session establishment request message in the step 7 above.

<Problems that May be Considered for LADN Service>

Figure 8:
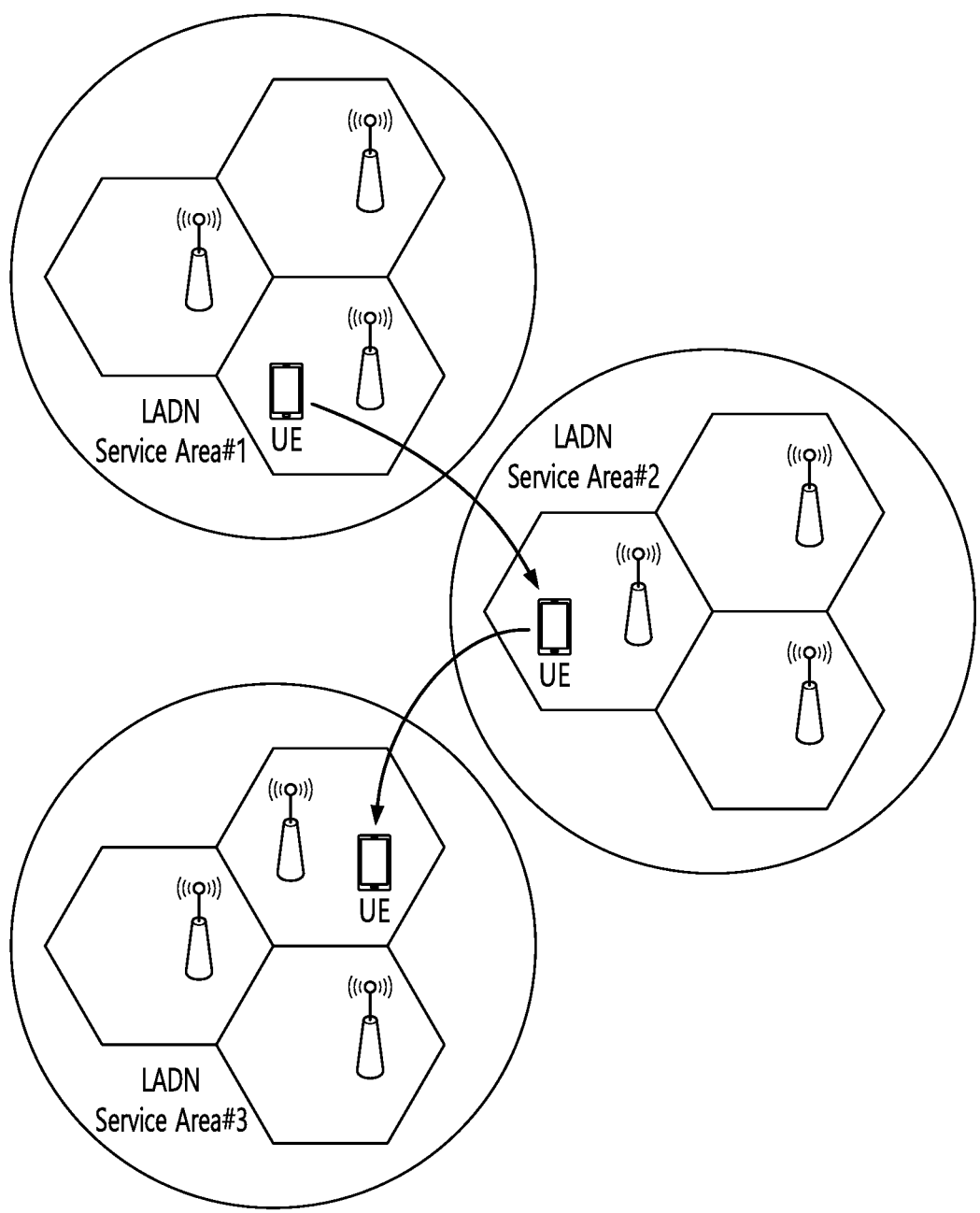
FIG. 8 shows an example in which the UE moves in the LADN service area.

FIG. 8 shows an example in which the UE moves in the LADN service area.

Referring to FIG. 8, the UE may move from the LADN service area #1 to the LADN service area #2 to the LADN service area #3.

If the above movement is performed when the UE is idle, a location update procedure (e.g., a tracking area update (TAU) procedure) may be performed. In this connection, the 5G core network may transmit information (i.e., LADN information) about the data network available to the UE along with the TAU list.

However, since the UE simply passes through the LADN service area #2, it may be inefficient to send LADN information to the UE in the LADN service area #2. In other words, the transmission of LADN information in the intermediate transit region causes a waste of network signaling/resources. Further, the UE may have a burden to receive and process unnecessary information.

On the other hand, when the terminal is connected to the network via the non-3GPP network, the network uses granularity of a non-3GPP interworking function (N3IWF) node to determine the location of the terminal, and as a result, there is a disadvantage in that the accuracy is lower than when the terminal is connected to the network via the 3GPP network.

It is determined whether to provide a service/session based on whether the terminal is located in a service area, and when the terminal is connected to the network via the non-3GPP network, it is difficult to accurately determine the location of the terminal, such that it is difficult to manage LADN sessions.

Disclosure of the Present Specification

In order to solve the above-described problem, an object of the present disclosure is to propose a method for efficient management of a PDU session in LADN.

The disclosure presented herein may be implemented together in one or more combinations of the following suggestions.

Hereinafter, it is assumed that LADN information/policy information described below includes information on an available data network name (DNN) and an authorized geographical area.

I. First Disclosure: Method for Performing Establishment and Management of LADN Session Through Different Access Networks A method according to a first disclosure relates to removing limitations of an access network in establishment and management of a LADN session.

Initial establishment of the LADN session via a particular access network and a PDU session handover between access networks may be established or managed based on a policy (for example, DNN selection policy of UE route selection policy (URSP)) regarding PDU session establishment and data routing.

Since the terminal can best know an access network to which the terminal is connected and a location of the terminal, the terminal can perform operations required for session establishment and data transmission and reception within a service coverage area.

When attempting to establish the LADN session via the non-3GPP access network, the terminal may determine whether to transmit a session establishment request to a local area data network (LADN) based on location information collected through the 3GPP access network.

That is, when it is determined that the terminal is in the service coverage area, the terminal may transmit a request for the session establishment and the data transmission to the network, but when it is determined that the terminal is not in the service coverage area, the terminal may not transmit the request for the session establishment and the data transmission to the network.

II. Second Disclosure: Method for Determining Location Information and Performing Event Notification of Terminal Regardless of Type of Access Network In a method according to a second disclosure, the network (that is, LADN) may utilize location information of the terminal reported through the 3GPP access network for the management of the LADN session established through the non-3GPP access network.

In order to realize the method according to the second disclosure, the LADN session established via the non-3GPP access network should be attached to the 3GPP access network at the same time.

The SMF node managing the session may register an area of interest (service coverage area) for determining the location of the UE and an event subscription for being reported about the location change event of the UE in the AMF node. In addition, the SMF node may determine whether the terminal is in the service coverage area of the LADN service based on the information received from the AMF node.

According to an embodiment, the SMF node may, based on the information received from the AMF node, determine whether the terminal is located in the area of interest (service coverage area) regardless of the access network in which the LADN session is established (that is, regardless of whether the access network in which the LADN session is established is the non-3GPP access network or the 3GPP access network). The AMF node may determine the location of the terminal based on the information collected through the 3GPP access network, and report the determined location of the terminal to the SMF node that registered the event subscription.

According to another embodiment, when the event subscription is registered in the AMF node, the SMF node may also provide, to the AMF, information on a type (that is, whether the access network is the non-3GPP access network or the 3GPP access network) of access network that will be used to determine the location of the terminal as well as the area of interest. In this case, the AMF node may determine the location of the UE and perform the event notification regardless of the type of access network for which the session is established. Also, when the type of access network is the non-3GPP access network, the AMF node determines the location of the UE and the event notification using the granularity of the non-3GPP interworking function (N3IWK) node reported via the non-3GPP access network.

III. Third Disclosure: How to Perform Establishment and Management of LADN Session Through Different Access Networks According to a method according to a third disclosure, when the LADN session is established via the non-3GPP access network, the network (that is, LADN) may determine whether the terminal is located within the area of interest (service coverage area) based on the location information of the terminal collected through the 3GPP access network, and the SMF node may be reported with whether the terminal is registered in the 3GPP access network (that is, whether the 3GPP access network is detached) from the AMF node. The SMF node may determine whether to disconnect the LADN session established via the non-3GPP access node based on the information on whether to register.

In addition, the network may additionally instruct the terminal to be temporarily de-registered (that is, re-attached after detached) for network management or path optimization, and the AMF node may transmit information that the de-registration of the 3GPP access network of the terminal is temporary to the SMF node. The SMF node does not disconnect the LADN session established via the non-3GPP access network and may deactivate the PDU session (that is, release only user plane resources for the PDU session and maintain the PDU session), based on the information that deregistration of the 3GPP access network of the terminal is temporary. According to the embodiment, the disconnection or deactivation of the PDU session may be determined based on the operator policy.

The SMF node may be reported from the AMF node about the event information according to the registration/deregistration of the access network (for example, 3GPP access network) that is different from the access network (for example, non-3GPP access network) in which the LADN session is established. That is, in order for the SMF node to receive the event information for the change in the registration status from the AMF node, the SMF node may register the event subscription, and provide the type of access network together when the event subscription is registered to be reported with the information on the change in the registration status of the provided access network providing the type. In addition, the SMF node may be additionally reported with the temporary disconnection information of the access network providing the type, and use the reported temporary disconnection information to simplify the session management.

Figure 9:
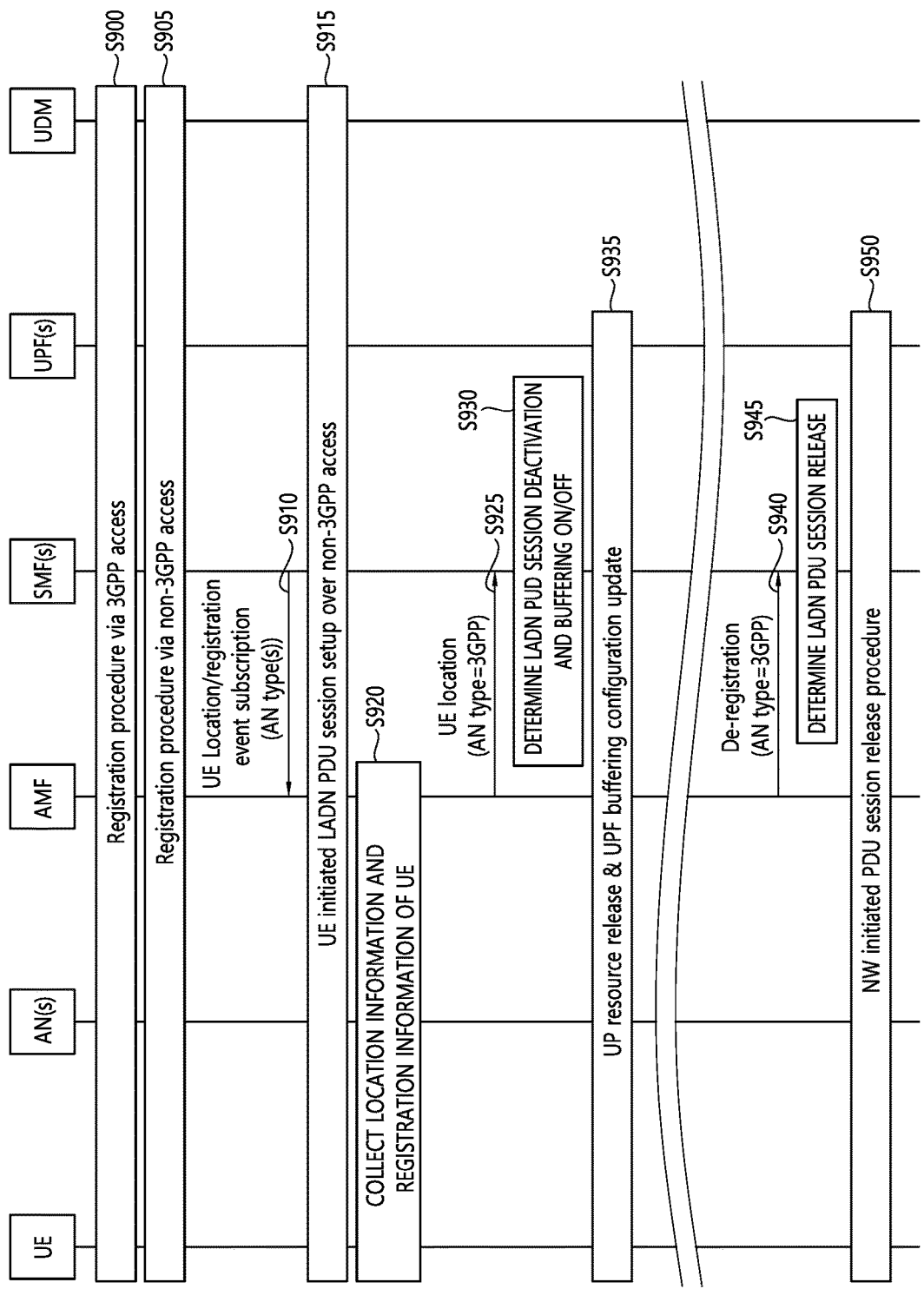
FIG. 9 shows a method for managing a LADN PDU session according to an embodiment of the present disclosure.

FIG. 9 shows a method for managing a LADN PDU session according to an embodiment of the present disclosure.

The method of managing a LADN PDU session shown in FIG. 9 represents a case in which the LADN PDU session of the non-3GPP access network is deactivated before the 3GPP access network is released. In this case, the SMF node may release the LADN session without maintaining the LADN any more.

Referring to FIG. 9, the terminal may access a 5G system via the 3GPP access network (S900). In addition, the terminal may access the 5G system via the non-3GPP access network (S905). According to the embodiment, the order in which the terminal accesses the 3GPP access network and the non-3GPP access network may be changed.

The SMF node may subscribe the event subscription to the AMF node (S910). The event subscription may be used to perform the notification for the change in the location of the UE and the registration for each access network. In order to receive the notification about the events generated in each access network, the SMF node may subscribe the event subscriptions for one or more access networks. According to the embodiment, the SMF node may subscribe to the event subscription for each access network. For example, as shown in FIG. 9, when the terminal uses the 3GPP access network and the non-3GPP access network, in order to receive the registration status and the location of the terminal for the 3GPP access network and the non-3GPP access network, respectively, the SMF node may subscribe the event subscription to the AMF node for the 3GPP access network and the non-3GPP access network, respectively.

According to the embodiment, the LADN PDU session may be set via the non-3GPP access network (S915). At this time, the AMF node may collect and manage the location information and registration status information of the UE (S920).

If it is determined that the UE is out of the established LADN coverage area, the AMF node may notify the SMF node of the change in the location of the UE (that is, the UE is out of the established LADN coverage area) (S925). The AMF node may notify the UE of the information (that is, through which access network the change in the location of the UE is collected) on the type of access network along with the change in the location of the UE. The information on the change in the location of the UE and the type of the access network may be understood through a cell ID and a TAU ID collected through the 3GPP access network.

In this case, the SMF node may determine whether to maintain the LADN session (S930). If the SMF node determines to deactivate the LADN session, the SMF node may additionally make a determination to manage UPF buffering. Here, the deactivation may mean not releasing the PDU session itself, but releasing only the resources of the user place (UP) by the PDU session and maintaining the context of the PDU session.

That is, when the SMF node may determine to deactivate the LADN session, the SMF node may release the resources of the user plane and transmit the information on the determined UPF buffering configuration to the UPF node, thereby performing the configuration update for the UPF buffering on/off (S935).

When the de-registration procedure of the 3GPP access network is performed, the AMF node may update a registration context and transmit a status update notification to the SMF node (S940).

The SMF node may determine whether to maintain the LADN PDU session established in the non-3GPP access network according to a network policy, DNN/APN, and/or subscriber information (S945).

When the SMF node recognizes that it can no longer collect UE location information through the 3GPP access network, the SMF node may release the LADN session (S950). That is, as shown in FIG. 9, when the LADN PDU session of the non-3GPP access network is deactivated before the 3GPP access network is released, the LADN session may be released without being maintained any more. Conversely, unlike one shown in FIG. 9, if it is determined that the LADN session is maintained based only on the information collected through the non-3GPP access network by the operator policy, the SMF node may not perform the PDU session release. In this case, the SMF node may notify the UE that the LADN service according to the exact location of the UE may not be provided, or may separately manage a charging record for a charging policy.

Figure 10:
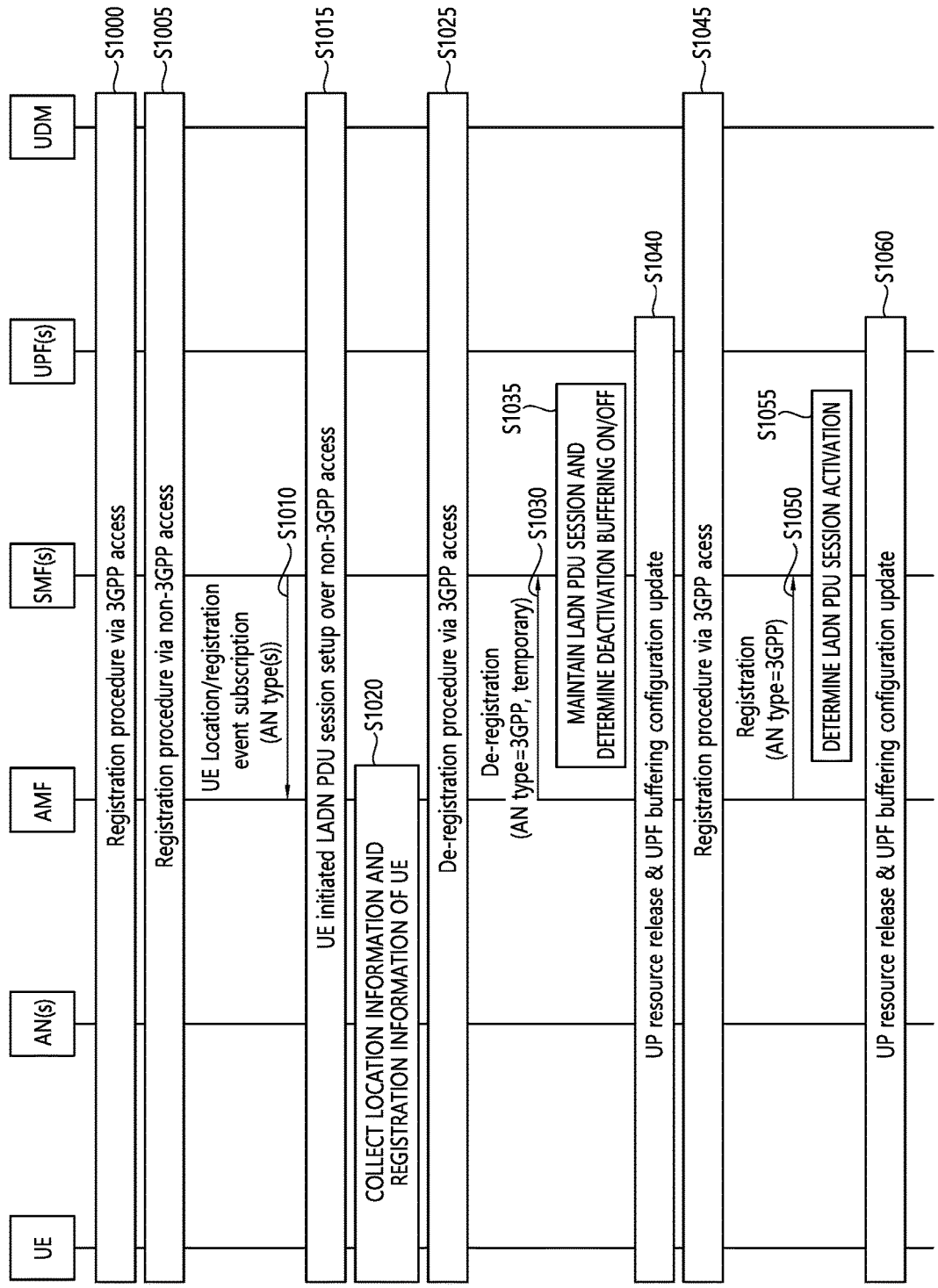
FIG. 10 shows a method for managing a LADN PDU session according to another embodiment of the present disclosure.

FIG. 10 shows a method for managing a LADN PDU session according to another embodiment of the present disclosure.

The method of managing a LADN PDU session shown in FIG. 10 represents a case where the SMF node recognizes that the release of the 3GPP access network is temporary. In this case, the SMF node may determine to deactivate the LADN session.

Referring to FIG. 10, the terminal may access the 5G system via the 3GPP access network (S1000). In addition, the terminal may additionally access the 5G system via the non-3GPP access network (S1005). According to the embodiment, the order in which the terminal accesses the 3GPP access network and the non-3GPP access network may be changed.

The SMF node may subscribe the event subscription to the AMF node (S1010). The event subscription may be used to perform the notification for the change in the location of the UE and the registration for each access network. In order to receive the notification about the events generated in each access network, the SMF node may subscribe the event subscriptions for one or more access networks. According to the embodiment, the SMF node may subscribe to the event subscription for each access network. For example, as shown in FIG. 9, when the terminal uses the 3GPP access network and the non-3GPP access network, in order to receive the registration status and the location of the terminal for the 3GPP access network and the non-3GPP access network, respectively, the SMF node may subscribe the event subscription to the AMF node for the 3GPP access network and the non-3GPP access network, respectively.

According to the embodiment, the LADN PDU session may be set via the non-3GPP access network (S1015). At this time, the AMF node may collect and manage the location information and registration status information of the UE (S1020).

According to the embodiment, the network may instruct the UE to perform de-registration with re-registration (detach with re-attach) for administrative purposes or congestion control (S1025). That is, according to the instruction of the network, the UE may be deregistered into the network for a while, and the SMF node may re-register the UE in the network after a predetermined time elapses.

The AMF node may update the registration context and may transmit a status update notification to the SMF node (S1030). At this time, the AMF node may recognize that deregistration is temporary de-registration, and thus may transmit information indicating temporary deregistration to the SMF node.

In this case, the SMF node may determine whether to maintain the LADN session (S1035). As shown in FIG. 10, when the SMF node recognizes that the release of the 3GPP access network is temporary, the SMF node may determine to deactivate the LADN session. In addition, when the SMF node determines to deactivate the LADN session, the SMF node may additionally make a determination to manage UPF buffering.

That is, when the SMF node may determine to deactivate the LADN session, the SMF node may release the user plane and transmit the information on the determined UPF buffering configuration to the UPF node, thereby performing the configuration update for the UPF buffering on/off (S1040).

According to the network instruction in step S1025, the UE may re-register with the 3GPP access network after a predetermined time elapses (S1045). If the re-registration procedure is successfully performed, the AMF node may transmit the information re-registered in the 3GPP access network by the UE to the SMF node (S1050).

The SMF node may determine whether to reactivate the deactivated LADN session (S1055). The SMF node may determine whether to reactivate the deactivated LADN session using the location information of the UE (that is, whether the UE is located in the LADN service area).

According to the embodiment, when the SMF node determines not to reactivate the LADN session, the SMF node may release the resources of the user plane. It is possible to perform the configuration update for the UPF buffering on/off by updating the determined information on the UPF buffering configuration and transmitting the updated information to the UPF node (S1060).

Figure 11:
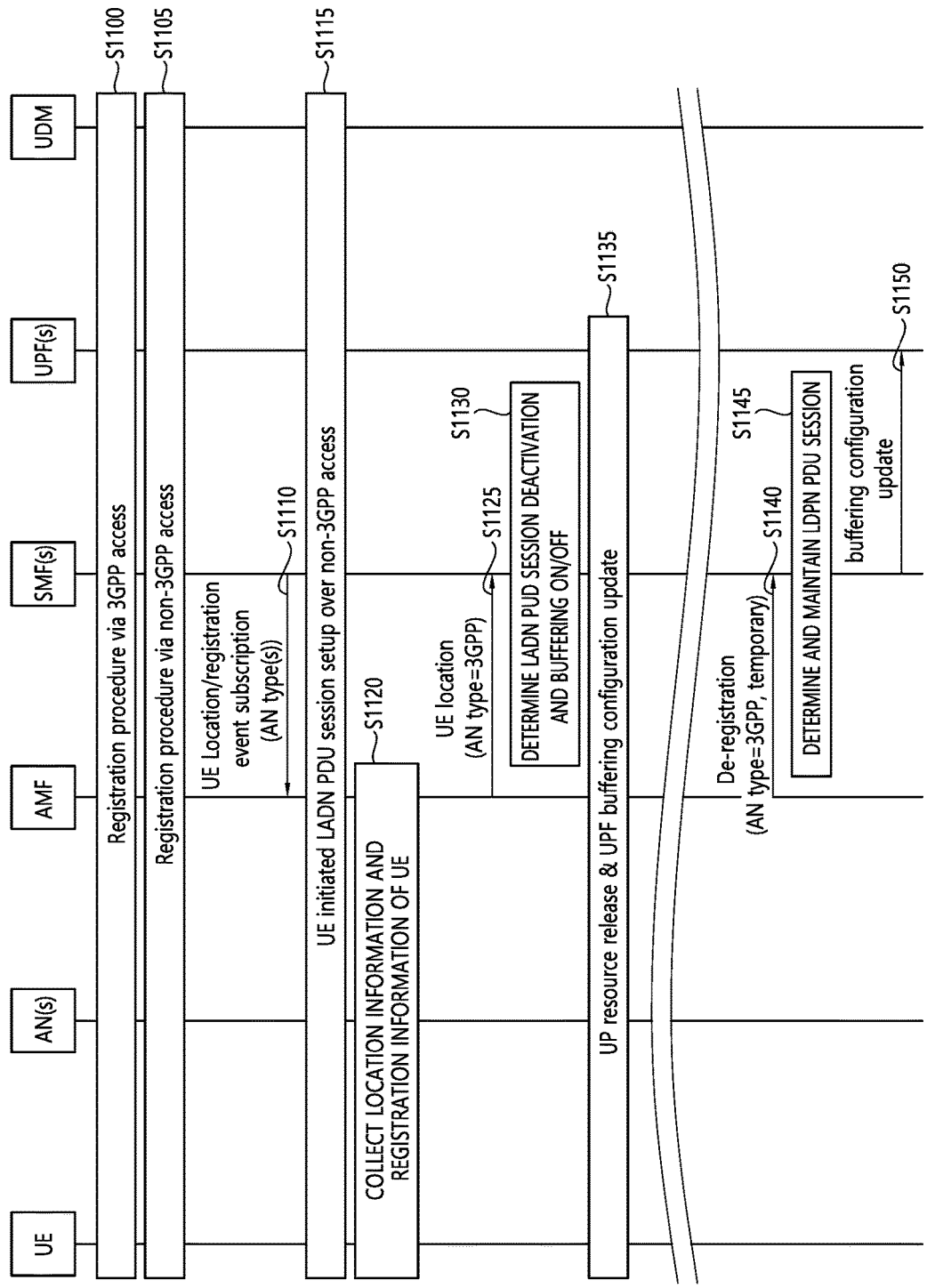
FIG. 11 shows a method for managing a LADN PDU session according to still another embodiment of the present disclosure.

FIG. 11 shows a method for managing a LADN PDU session according to still another embodiment of the present disclosure.

In the method for managing the LADN PDU session shown in FIG. 11, the PDU session of the LADN of the non-3GPP access network is deactivated before the de-registration procedure of the 3GPP access network is performed, and the SMF node represents the case where the de-registration of the 3GPP access network is temporary. In this case, the SMF node may maintain the LADN PDU session established in the non-3GPP access network, update only the information on the determined UPF buffering configuration, and transmit the updated information to the UPF node.

Referring to FIG. 11, the UE may access the 5G system via the 3GPP access network (S1100). In addition, the UE may access the 5G system via the non-3GPP access network (S1105). According to the embodiment, the order in which the UE accesses the 3GPP access network and the non-3GPP access network may be changed.

The SMF node may subscribe the event subscription to the AMF node (S1110). The event subscription may be used to perform the notification for the change in the location of the UE and the registration for each access network. In order to receive the notification about the events generated in each access network, the SMF node may subscribe the event subscriptions for one or more access networks. According to the embodiment, the SMF node may subscribe to the event subscription for each access network. For example, as shown in FIG. 9, when the terminal uses the 3GPP access network and the non-3GPP access network, in order to receive the registration status and the location of the terminal for the 3GPP access network and the non-3GPP access network, respectively, the SMF node may subscribe the event subscription to the AMF node for the 3GPP access network and the non-3GPP access network, respectively.

According to the embodiment, the LADN PDU session may be set via the non-3GPP access network (S1115). At this time, the AMF node may collect and manage the location information and registration status information of the UE (S1120).

If it is determined that the UE is out of the established LADN coverage area, the AMF node may notify the SMF node of the change in the location of the UE (that is, the UE is out of the established LADN coverage area) (S1125). The AMF node may notify the UE of the information (that is, through which access network the change in the location of the UE is collected) on the type of access network along with the change in the location of the UE. The information on the change in the location of the UE and the type of the access network may be understood through a cell ID and a TAU ID collected through the 3GPP access network.

In this case, the SMF node may determine whether to maintain the LADN session (S1130). If the SMF node determines to deactivate the LADN session, the SMF node may additionally make a determination to manage UPF buffering.

That is, when the SMF node may determine to deactivate the LADN session, the SMF node may release the resources of the user plane and transmit the information on the determined UPF buffering configuration to the UPF node, thereby performing the configuration update for the UPF buffering on/off (S1135).

When the de-registration procedure of the 3GPP access network is performed, the AMF node may update the registration context and transmit the status update notification to the SMF node (S1140). At this time, the AMF node may recognize that the deregistration is temporary deregistration, and thus may transmit the information indicating the temporary deregistration to the SMF node.

The SMF node may determine whether to maintain the LADN PDU session established in the non-3GPP access network according to the network policy, the DNN/APN, and/or the subscriber information. As shown in FIG. 11, when the PDU session of the LADN of the non-3GPP access network is deactivated before the de-registration procedure of the 3GPP access network is performed, and the SMF node recognizes that the de-registration of the 3GPP access network is temporary, the SMF node may determine the maintenance of the LADN PDU session established in the non-3GPP access network according to the network policy, the DNN/APN, and/or the subscriber information (S1145).

In this case, the SMF node may update the information on the determined UPF buffering configuration and transmit the updated information to the UPF node (S1160). The updated information on the UPF buffering configuration may include the information on the readjustment of the buffering time as well as the information on the change in the buffering on/off.

The contents described so far may be implemented in hardware. This will be described with reference to the drawings.

Figure 12:
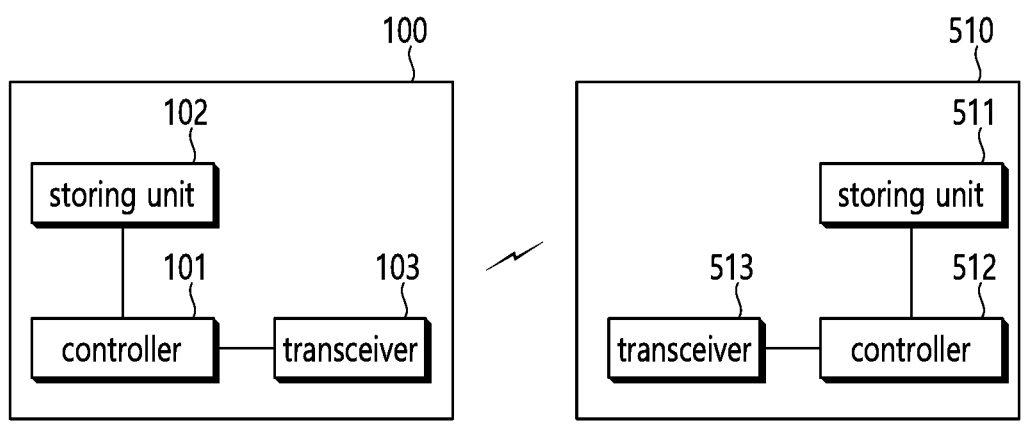
FIG. 12 is a configuration block diagram of a UE and a network node according to an embodiment of the present disclosure.

FIG. 12 is a configuration block diagram of a UE and a network node according to an embodiment of the present disclosure.

As shown in FIG. 12, the UE 100 includes a storage 101, a controller 102, and a transmitting and receiving module 103. In addition, the network node may be an access network (AN), a radio access network (RAN), an AMF node, a CP function node, or an SMF node. The network node includes a storage 511, a controller 512, and a transmitting and receiving module 513.

The storages may store therein modules configured to perform the above-described method.

The controllers may control the storages and the transmitting and receiving modules to perform the above-described method. Specifically, the controllers each execute modules configured to perform the methods, as stored in the storages. The controllers transmit the aforementioned signals through the transmitting and receiving modules.

While the present disclosure has been particularly shown and described with reference to the exemplary embodiments thereof, it is to be understood that the disclosure is not limited to the disclosed exemplary embodiments. Thus, the present disclosure may be modified, changed, or improved in various forms within the scope of the present disclosure and the scope of the claims.

What is claimed is:

1. A method performed by a session management function (SMF) node and comprising:
    transmitting to an access and mobility management function (AMF) node a registration request,
    wherein the registration request includes a request for notification of information relating to a user equipment (UE), wherein the UE is registered to both a 3rd generation partnership project (3GPP) access network and a non-3GPP access network, and wherein a local area data network (LADN) protocol data unit (PDU) session is established for the UE over the non-3GPP access network;
    receiving the information relating to the UE from the AMF node,
    wherein the information relating to the UE from the AMF node includes i) first information informing the SMF node of location information relating to the UE, and ii) second information informing the SMF node that the UE is de-registered from the 3GPP access network; and
    determining whether to release or deactivate the LADN PDU session based on the first information and the second information.

2. The method of claim 1, wherein deactivating the LADN PDU session of the UE does not release the LADN PDU session itself, it releases a resource of a user plane (UP) for the LADN PDU session, and maintains a context of the LADN PDU session.

3. The method of claim 2, wherein in the determining whether to release or deactivate the LADN PDU session, the LADN PDU session of the UE is determined to be deactivated, and the first information is collected by the 3GPP access network.

4. The method of claim 1, wherein the second information further includes information indicating that de registration from the 3GPP access network is temporary, and wherein the method of claim 1 further comprises:
    receiving, from the AMF node, registration information indicating reconnection based on the UE being reconnected to the 3GPP access network according to the second information; and
    determining whether to reactivate the deactivated LADN PDU session.

5. The method of claim 1, wherein the second information further includes information indicating that de-registration from the 3GPP access network is temporary, and wherein, the method of claim 1 further comprises:
    receiving, from the AMF node, registration information indicating reconnection based on the UE being reconnected to the 3GPP access network according to the second information; and
    continuously deactivating the non-3GPP access network and changing a buffering setting of a user plane function (UPF), based on the non-3GPP access network being deactivated before the 3GPP access network is released.

6. A session management function (SMF) node comprising:
    a transceiver configured to transmit to an access and mobility management function (AMF) node a registration request,
    wherein the registration request includes a request for notification of information relating to a user equipment (UE),
    wherein the UE is registered to both a 3rd generation partnership project (3GPP) access network and a non-3GPP access network, and wherein a local area data network (LADN) protocol data unit (PDU) session is established for the UE over the non-3GPP access network;
    a transceiver configured to receive the information relating to the UE from the AMF node, wherein the information relating to the UE includes i) first information informing the SMF node of location information relating to the UE, and ii) second information informing the SMF node that the UE is de-registered from the 3GPP access network; and
    a processor configured to determine whether to release or deactivate the LADN PDU session based on the first information and the second information.

7. The SMF node of claim 6, wherein deactivating the LADN PDU session does not release the LADN PDU session itself, it releases a resource of a user plane (UP) for the LADN PDU session, and maintains a context of the LADN PDU session.

8. The SMF node of claim 7, wherein the processor determines to deactivate the LADN PDU session, and the first information is collected by the 3GPP access network.

9. The SMF node of claim 6,
wherein the second information further includes information indicating that de-registration from the 3GPP access network is temporary,
wherein the transceiver receives, from the AMF node, registration information indicating reconnection based on the UE is reconnected to the 3GPP access network according to the second information, and
wherein the processor determines whether to reactivate the deactivated LADU PDU session.

10. The SMF node of claim 6,
wherein the second information further includes information indicating that the registration from the 3GPP access network is temporary,
wherein the transceiver receives, from the AMF node, registration information indicating reconnection based on the UE being reconnected to the 3GPP access network according to the second information, and
wherein the processor continues to deactivate the non-3GPP access network and change a buffering configuration of a user plane function (UPF) based on the non-3GPP access network being deactivated before the 3GPP access network is released.

* * * * *